Dec. 17, 1968  A. B. NELSON  3,416,556
COMBINATION SILL-COCK AND VACUUM BREAKER
Filed Aug. 22, 1966

INVENTOR.
AXEL B. NELSON
BY

PARKER & CARTER
ATTORNEYS

United States Patent Office 3,416,556
Patented Dec. 17, 1968

3,416,556
COMBINATION SILL-COCK AND
VACUUM BREAKER
Axel B. Nelson, Mount Prospect, Ill., assignor to Sloan Valve Company, Chicago, Ill., a corporation of Illinois
Filed Aug. 22, 1966, Ser. No. 574,171
10 Claims. (Cl. 137—218)

This invention relates in general to valve structures and more particularly to a valve structure in which there is incorporated a vacuum breaker device, and the principal object of the invention is the provision of a new and improved valve of the aforesaid type which is simple in construction, reliable in operation and relatively economical to manufacture.

An object of the invention is the production of a new and improved valve of the sill-cock type combined with a vacuum breaking arrangement for preventing back-syphonage through the valve.

A further object is the provision of a novel combination sill-cock and vacuum breaker in which the various elements and parts thereof are inter-related and compactly arranged into a single unitary structure.

As is well known sill-cocks are usually installed in the ouside walls of buildings as control valves for lawn sprinkling purposes. The garden hose attached to the sill-cock at times lies upon the grass and is often submerged in pools of water, which water in many cases is polluted with fertilizer, chemical sprays and other poisonous substances. In the event that a drop in the supply line pressure takes place, or a vacuum occurs in the water supply line for various known reasons, the contaminated water is sucked or forced back into the pure water supply system, resulting in a health hazard. In the past it has been customary to provide a separate vacuum breaker device screwed directly upon the outlet end of the sill-cock. This was often easily removed and discarded or did not function reliably to prevent back-syphonage. It also added to the cost. Another arrangement utilized an elevated pipe loop in the supply pipe to the sill-cock with a vacuum breaker connected to the top of the loop. Such an instllation was also unsatisfactory and costly.

It is accordingly an object of the invention to design a simple unitary valve structure incorporating a vacuum breaker and a sill-cock which is easy to install, operates reliably and obviates the disadvantages pointed out in prior arrangements.

Still further objects of the invention reside in the details of construction of the various parts and in their combination and mode of operation as hereinafter described. In accomplishing the above and other objects of the invention, the improved constructional details are described and illustrated in the accompanying drawings, wherein:

FIGURE 4 is a cross-section of the valve guide sleeve; while

Figure 1:
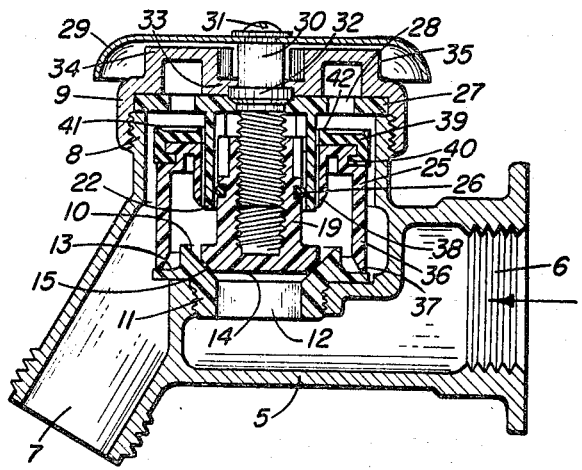
FIGURE 1 is a cross-sectional elevation of a preferred form of combination sill-cock and vacuum breaker, shown in closed position.

Referring to the drawings, FIGURE 1 shows the device in the position in which water flow through the valve is completely shut off. The device comprises a hollow body 5 preferably formed of a brass casting having a threaded water supply inlet 6 and outlet 7, together with a top opening 8 having a bonnet 9 threaded onto the opening 8 as shown. A main valve seat 10 is formed on an insert 11 which is threaded into the body 5 and forms the passage 12 between the inlet 6 and outlet 7. A secondary valve seat 13 is formed on insert 11 concentric with and around the outside of the main valve seat 10. A valve plug 14 is arranged axially in the body 5 in position to open and close upon the main valve seat 10. A valve plug 14 is arranged axially in the body The valve plug 14 has tapered sides 15 to fit the tapered contour of the valve seat 10.

Figure 4:
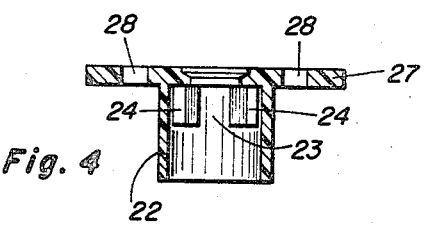
Figure 5:
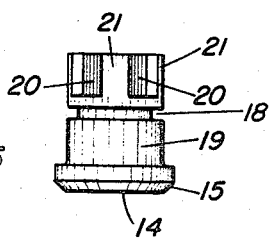
FIGURE 5 is a side view of the valve member which cooperates with the guide sleeve.

Valve plug 14 has an upwardly extended shank or stem 19 formed integral therewith, and at the upper end a series of alternate slots 20 and lugs 21 formed around the circumference of the stem 19 as best seen in FIGURE 5. The stem 19 is arranged to be moved up and down within an inverted cup-shaped guide sleeve 22. The internal diameter of guide sleeve 22 is provided with a series of alternate slots 23 and lugs 24 arranged for interfitting engagement with the associated slots 20 and lugs 21 of valve plug 14 and in slidable relationship therewith. FIGURE 4 depicts the slots 23 and lugs 24 in the guide sleeve 22 more clearly.

In order to provide a seal against leakage outward around the stem 19, an O-ring 26 is recessed in a groove 18 formed around the stem 19 below the sets of slots 20 and lugs 21. The guide sleeve 22 is provided at its upper end with an integral formed flange 27 the edge portion of which is clamped between the valve opening 8 and the bonnet 9 to hold the guide sleeve in position in the body 5. This flange 27 also serves as a leak-proof seal and gasket for the interior of the valve body 5 under certain conditions, as will be apparent. The flange portion 27 is also provided with a series of air vents 28 arranged outside the cylindrical body portion of guide sleeve member 22.

Figure 3:
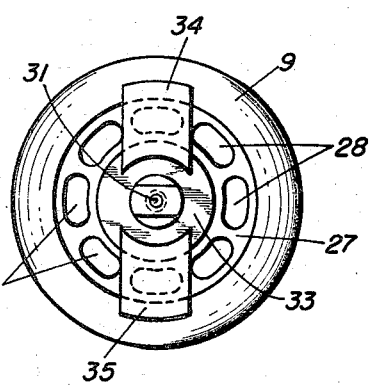
FIGURE 3 is a top view shown with the wheel handle removed.

An operating stem 30 for the sill-cock extends axially through the valve stem 19 for a greater portion of its length and in left-hand threaded engagement therewith. A manually operated wheel handle 29 is attached by screw 31 at the upper end of stem 30. The wheel handle 29 also serves as a shield for the air vents 28. The stem 30 has a collar 32 formed on it the lower side of which is recessed in the top of flange 27. The upper side of collar 32 is similarly recessed in the bottom of a ring-like portion 33 formed integral with two bridging members 34 and 35, the outer ends of which are formed integral with the bonnet 9, as best seen in FIGURE 3. With the foregoing arrangement of parts it is seen that the collar 32 is clamped between the ring member 33 and the flange 27 so that it is prevented from moving vertically while permitting rotative movement of the collar 33 and therefore the valve steam 30 whenever the wheel handle 29 is turned.

In the shut off position of the sill-cock, FIGURE 1, the valve plug 14 makes a tight fit against main valve seat 10 and against the fluid pressure from inlet 6. In this position the wheel handle 29 has been rotated clock-wise so that the operating stem 30 is threaded the maximum distance out of valve stem 19. Because the collar 32 is held in place, the operating stem 30 does not rise and the wheel handle 29 remains in the same position on the bonnet 9 with respect to the valve body. Due to the interfitting slots and lugs on both the guide sleeve 22 and valve stem 19, the vertical movement of the plug 14 is permitted while rotary movement is prevented. This action greatly reduces the wear upon the valve seat 10 and there is less chance that either seating surfaces will become grooved or have abrasive substances ground into them as would occur with a turning movement of the valve plug. The height of the wheel handle 29 also remains constant in all its positions. When the wheel handle 29 is turned to the left to open the valve to water flow or to throttle the flow as shown in FIGURE 2, the slots and lugs slidably interfit without rotation, and the valve plug 14 is moved upward the desired distance away from its seat 10.

The foregoing action takes place whenever the sill-cock is shut off or the water flow is to be throttled down, and is entirely separate and distinct from the action of the vacuum breaker which in no way interferes with the free flow of water through the valve under ordinary conditions.

The vacuum breaker portion of the valve includes a moveable inverted cup-shaped member indicated generally at 25 having a depending cylindrical outer wall portion 36, the lower end 37 of which is tapered to an edge which in the shut-off position of the device in FIGURE 1 seats upon the outer valve seat 13. The inner cylindrical wall portion 38 is arranged for slidable engagement with the outer circumference of the guide sleeve 22. At the upper end of the vacuum breaker unit 25 where the wall portions 37 and 38 are joined, there is arranged a rubber seating valve member 39, the outer edge of which is held in place by being recessed in a groove 40 formed around the outside of the unit 25. The upper end of valve member 39 is provided with integral upstanding inner and outer circular valve seating portions 41 and 42 which are adapted, in the position shown in FIGURE 2, to close off the air vents 28. The vacuum breaker device 25 is buoyant and acts in the nature of a float.

Figure 2:
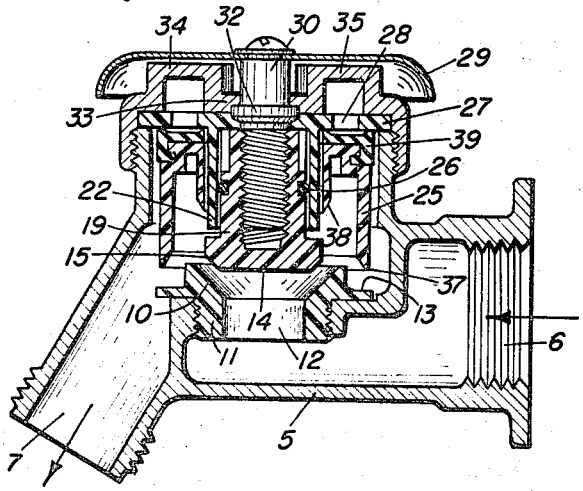
FIGURE 2 is a similar view with the sill-cock in open position to permit flow of water through it.

Whenever the sill-cock is in use and the valve plug 14 is in open position as shown in FIGURE 2, water flow will buoy or force the vacuum breaker 25 upwardly the inner wall portion 38 being guided in its upward axial movement by the guide sleeve 22 so the vacuum breaker will not stick or become wedged sideways during turbulent water flow. In the uppermost position valve seating member 39 closes its seating rings 40 and 41 around the series of air vents 28 thereby preventing leakage outward through the bonnet 9 and under the wheel handle 29. When water flow is shut off by the valve member 14, the vacuum breaker 25 drops down again, opening the air vents 28 and permitting entry of atmospheric pressure to the interior of the device and the outlet side 7 so the unit can drain itself.

In the event that a vacuum condition exists on the inlet supply side 6 of the sill-cock during the time it is in the open position, as indicated in FIGURE 2, the vacuum breaker 25 will be instantly sucked down so that its tapered edge 37 will close upon secondary valve seat 13 thereby acting as a back check to prevent back syphonage of possible contaminated water from the outlet end 7. FIGURE 1 shows this position of the vacuum breaker. At the same time the rubber valve member 39 drops away from its seated position on air vents 28 permitting atmospheric pressure to enter the air vents and the interior of the valve structure, to break any syphonic action which may tend to occur, thereby assuring double protection in such an event.

It is highly desirable that the parts of the valve structure exposed to water flow, be made of materials which are not subject to corrosion, pitting and possible electrolytic action, usually caused by impurities in the water. To this end the valve plug 14 and stem 19 are preferably moulded out of a plastic material such as DuPont "NYLON" and guide sleeve 22 of the same material. The vacuum breaker 25 is preferably molded out of polypropylene for its light weight and buoyancy, while the main valve seat insert 11 is made of Du Pont "DELRIN." These materials exhibit other desirable characteristics, are economical to mold and need no added machining.

It will be appreciated that various details of structure, operation and arrangement of the parts and elements may be changed or modified without departing from the spirit of the invention or exceeding the scope of the appended claims.

What is claimed is:

1. In a valve structure, a valve body having an inlet, an outlet and a bonnet opening, a main valve seat in said body, a movable valve plug cooperating with said valve seat to control the flow of water through said valve, a guide sleeve within which said valve plug is adapted to reciprocate, said guide sleeve having a flange portion around one end thereof, a bonnet on said body, said bonnet clamping the flange portion of said guide sleeve to said bonnet opening, said bonnet and said flange portion having vent openings therein leading into the interior of said body, a valve stem threaded into said valve plug from said bonnet, an operating handle on said valve stem for closing and opening said valve plug from said valve seat, and a vacuum breaker device incorporated in said valve structure, comprising a hollow inverted cup-shaped member having an inner wall portion surrounding said guide sleeve and slidable thereon, an outer wall portion spaced from said inner wall portion, the upper joined ends of said inner and outer wall portions forming air valve means adapted to close upon said air vents whenever said cup-shaped member is moved upwardly on said guide sleeve by flow of water through said valve, and a check valve seat formed in said valve body surrounding said main valve seat, said vacuum breaker device sliding downward so the bottom end of said outer wall is adapted to close upon said check valve seat and said air vents are opened, whenever a vacuum condition exists at the valve inlet.

2. In a valve structure, a valve body having an inlet, an outlet and a bonnet opening therein, a main valve seat in said body, a moveable valve plug adapted to open and close upon said main valve seat to control the flow of water through said valve body, a hollow guide sleeve within which said valve plug is adapted to reciprocate, said guide sleeve having an annular flange at one end thereof with air vents formed therein, a bonnet having air vents therein and clamping said flange to said bonnet opening, and vacuum breaker means in said valve body comprising a hollow-inverted cup-shaped valve member having an inner wall portion and an outer wall portion joined together at their upper ends to form a valve seat adapted to close upon said air vents in response to water flow, said inner wall portion surrounding said guide sleeve and in slidable relationship therewith, a back check valve seat in said body surrounding main valve seat, the lower edge of said outer wall portion adapted to open and close upon said check valve seat in response to a vacuum condition at said valve inlet and said air vents being opened at the same time.

3. In a valve structure, an inlet, an outlet, and a main valve seat therebetween, a valve plug adapted to control the water flow through said valve seat, a guide sleeve in said body within which said valve plug is adapted to be manually moveable, said guide sleeve having a flange portion at one end with air vents therein, means for fastening said flange portion to said valve body, and a vacuum breaker device in said body comprising an inverted cup-shaped member having an inner wall portion surrounding said guide sleeve and in slidable engagement therewith, an outer wall portion on said cup-shaped member having a lower edge portion surrounding said main valve seat and constituting a valve closing member adapted to close around said main valve seat to shut off water flow upon the occurrence of a vacuum condition, and a second valve closing member on the top portion of said cup-shaped member to close said air vents upon water flow through said valve and to open said air vents upon the occurrence of a vacuum condition.

4. In a valve structure, an inlet, an outlet and a main valve seat there-between, a valve plug normally operative to control the water flow through said valve seat, a guide sleeve in said body within which said valve plug is axially moveable with respect to said valve seat, said guide sleeve having a flange portion at one end with air vents therein, a bonnet clamping said flange portion to said valve body, in combination with a vacuum breaking device incorporated in said valve body, said device comprising a cup-shaped cylindrical member having an inner wall portion slidable on the outside of said guide sleeve, an outer wall portion having a lower edge surrounding said main seat and adapted to close upon the same whenever a vacuum condition exists at said inlet, and to open the same upon water flow, said cup-shaped member having a valve seating portion on its upper end adapted to close said air vents upon water flow and to open the same upon the occurrence of a vacuum condition, said guide sleeve having a series of slots and lugs formed around the inner wall thereof, and said valve plug having a stem with a series of slots and lugs around the same, the slots and lugs of both guide sleeve and valve stem interfitting and being in slidable relationship with one another whereby said valve plug is made to move vertically with respect to said main valve seat.

5. In combination a sill-cock and vacuum breaker in which the sill-cock includes a main valve seat and a valve member adapted to open and close upon the main valve seat, a guide sleeve within which the valve member stem is adapted to reciprocate, said vacuum breaker comprising an inverted cup-shaped member having an axial opening surrounded by an inner wall in slidable engagement with the outside of wall of said guide sleeve, an outer wall on said vacuum breaker the lower end of which is adapted to open and close upon said main valve seat outside of and around said valve member, said guide sleeve having a series of air vents therein, and a valve member on the top end of said vacuum breaker adapted to open and close upon said air vents.

6. The combination within a valve structure of a vacuum breaker in which the valve structure has a main valve seat adapted to be closed and opened by a valve plug to control the flow of water through the valve, a guide sleeve supported in said valve within which said valve plug is adapted to be manually operated, said guide sleeve having a series of air vents formed in its supporting end, said vacuum breaker comprising an inverted cup-shaped member having spaced apart inner and outer depending walls, the inner wall being in slidable relationship with the outside wall of said guide sleeve, said main valve seat having a secondary valve seat formed concentric therewith and with said valve plug, the lower end of said outer depending wall being arranged in operative relationship to said secondary valve seat, an air vent valve member supported on the top end of said cup-shaped member in operative relationship to said air vents, said cup-shaped member adapted to close said air vents upon water flow through said valve and to open the same on a vacuum condition, and to close said secondary valve seat upon a vacuum condition and to open the same on water flow through the valve.

7. The combination valve structure and vacuum breaker as claimed in claim 6 in which the air vent valve member of the vacuum breaker consists of two concentric upstanding rubber rings adapted to close upon said air vents to prevent leakage therethrough.

8. The combination valve structure and vacuum breaker as claimed in claim 6 in which the air vent valve member is supported on the top end of the cup-shaped member by a turned in edge recessed in a groove formed in the cup-shaped member.

9. The combination valve structure and vacuum breaker as claimed in claim 6 in which the main valve seat is tapered and former in an insert threaded into the valve structure and is surrounded by the secondary valve seat which is flat.

10. The combination claimed in claim 6 in which the valve plug and guide sleeve are arranged with interfitting means whereby said valve plug is opened and closed upon said main valve seat with a direct vertical movement and the operating valve stem is of the non-rising type.

References Cited

UNITED STATES PATENTS

| | | | |
|---|---|---|---|
| 949,115 | 2/1910 | Davey | 251—266 |
| 1,976,796 | 10/1934 | Milner | 251—266 |
| 2,133,804 | 10/1938 | Brooks | 137—218 |
| 2,325,956 | 8/1943 | Holtman | 137—218 |
| 2,472,933 | 6/1949 | Anderson | 137—218 |
| 2,584,436 | 2/1952 | Donaldson | 137—218 |
| 2,590,386 | 3/1952 | Dobrick | 137—218 |
| 3,106,935 | 10/1963 | Gatzke | 137—218 |
| 3,180,352 | 4/1965 | Kersten et al. | 137—218 |

FRANK J. COHEN, *Primary Examiner.*

W. H. SCHROEDER, *Assistant Examiner.*

U.S. Cl. X.R.

137—525; 251—266